Patented Nov. 9, 1948

2,453,559

UNITED STATES PATENT OFFICE 2,453,559

POLYLACTYLIC ACID RESINS AND PROCESS FOR MAKING THEM

Paul D. Watson, Arlington, Va., assignor to the United States of America as represented by the Secretary of Agriculture No Drawing. Original application May 27, 1944, Serial No. 537,663. Divided and this application June 18, 1946, Serial No. 677,467

7 Claims. (Cl. 260—23.3)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This application is a division of my copending application Serial No. 537,663, filed May 27, 1944, which was in turn a continuation in part of my application Serial No. 441,236, filed April 30, 1942, which resulted in the issuance of Patent No. 2,363,103 on November 21, 1944, the disclosure of which is incorporated herein by reference.

This invention relates to improvements in coating compositions comprising the condensation product of polylactylic acids (also known as polylactyllactic acids) and fatty drying oils and to the process of making them.

The coating compositions of this invention are especially suitable for use as protective finishes on metal food containers and other articles. The baked coatings have an unusually high degree of adhesion and flexibility.

Due to present war conditions, there is a shortage in the supply of tin and other materials such as phthalic anhydride and glycerol commonly used in large quantities in the manufacture of flexible coatings. Since the coatings of this invention are derived from other sources, an alleviation of the present situation may be attained by their use in industry.

The present invention is directed generally to and an object thereof comprises the modification of the process of making the resin by the addition of certain other resinous compounds which improve the chemical resistance of the coatings (principally the resistance of the coatings to alkalies). The hardness, drying and baking properties of the coatings are in certain instances likewise improved. I have discovered that these improved properties may be induced in the polylactylic-fatty drying oil condensation product containing about 35 to 70% polylactylic acid and 20 to 50% of the fatty drying oil by the addition of about 10 to 15 percent of one or more of the following polymeric materials: Polymerized olefinic hydrocarbons; polymerized cycloparaffin (naphthene) hydrocarbons; oil-soluble phenol-formaldehyde resin such as butyl, amyl, hexyl, phenyl, naphthyl, and diphenyl phenol-formaldehyde; melamine-formaldehyde resin.

The following examples are illustrative of this invention, and all parts are given by weight. The apparatus employed in each of these examples comprised an open vessel equipped with an efficient stirrer and means for the introduction of an inert gas, such as nitrogen, which was bubbled through the mixture in each instance.

*Example 1.—Modification with polymeric olefinic hydrocarbons*

One hundred twenty parts of polylactylic acids and 25 parts of castor oil were placed in the apparatus referred to above and heated for 90 minutes while the temperature was gradually raised from 105° C. to 228° C. Then 25 parts of linseed oil were added, followed by 2 parts of activated bauxite. After holding at about 228° C. for 25 minutes, 5 parts of maleic anhydride were added, followed after 20 minutes with 5 parts of fumaric acid with the temperature at 236° C. The temperature was gradually increased to 255° C. during the next 15 minutes, and 20 parts of polymerized olefinic hydrocarbons (petropols) derived from cracked petroleum distillates were then added. A further description of petropols may be found in Mattiello, Protective and decorative coatings, 1941, volume I, pages 482 to 484. The temperature was then held at 255° C. to 260° C. for 40 minutes, and then raised to 266° C. to 269° C. for 25 minutes, when the viscosity suddenly increased. The resin was rapidly cooled and xylol was added to the hot resin while being stirred in order to effect solution.

The coating solution was adjusted to about a 25% resin content, and metallic naphthenate driers added as follows, the percentage indicating the weight of metal added to the resin: Cobalt 0.05%; manganese 0.05%; zinc 0.10%. This coating was tested by baking two coats on steel at 205° C., the first for 20 minutes and the second for 40 minutes. The coating had good resistance to steam and fair resistance to alkali. It was also resistant to gasoline and oil. When chilled to −16° C. (20 minutes bake at 205° C.), the coating did not become brittle. This coating composition yielded films which set within a few minutes and dried in the air.

Example 2.—Modification with polymerized cycloparaffin hydrocarbons

Thirty parts of cycloparaffin (naphthene) hydrocarbon polymers derived from coke oven distillates were heated together with 50 parts of conjugated linseed oil, and xylol was added to aid in solution. These cycloparaffin (naphthene) hydrocarbon polymers are white solid resins having a melting point of from 145° to 155° C. and are the products resulting from the hydrogenation of coumarone-indene resins. They are further described in Mattiello, Protective and decorative coatings, 1941, volume I, page 389. When dissolved, the solution was introduced into the apparatus referred to, which contained 120 parts of polylactylic acids at a temperature of 100° C. The temperature was gradually raised to 275° C. during a period of 85 minutes and held at 275° C. to 280° C. for 65 minutes. The temperature was increased to 300° C. during the next 15 minutes when the resin began to gel. It was cooled rapidly, and xylol added while the hot resin was stirred. The resin dissolved very slowly, and complete solution was effected by the addition of some methyl n-amyl ketone to the xylol mixture.

The resin solution was adjusted to about 25% solids content and metallic naphthenate driers added as follows, the percentage indicating the weight of metal added to the resin: 0.03% cobalt; 0.03% manganese; 0.12% zinc. Three coats were baked on steel at 205° C., the first for 30 minutes, the second for 30 minutes, and the third for 55 minutes. The resistance of this coating was excellent when tested in 1% sodium hydroxide and also had fair resistance to steam. The coating was also resistant to 50% sulphuric acid, 50% acetic acid and to concentrated hydrochloric acid. This coating also set within a few minutes and dried in the air.

In my process, it is advisable to effect ester interchange first by heating the components at a relatively low temperature (below 250° C.) before increasing the temperature in order to induce molecular polymerization. Castor oil can be reacted directly with the polylactylic acids without first forming the free fatty acids or monoglycerides. I have found that this facilitates the subsequent incorporation of non-hydroxylated oils such as linseed or soybean oils, and thereby shortens the heating time necessary for the preparation of the resin. Dehydration of the castor oil is carried out simultaneously with its condensation with the polylactylic acids, and other polymeric substances.

Particularly rapid combination of fatty oils with polylactylic acids is effected by using conjugated linseed oil, or a mixture of hydroxylated and conjugated linseed oils. The slower reaction and lower yields obtained when oils such as straight linseed or soya bean oil are used is evidently due to the increased period of heating required for the non-conjugated fatty acid chains to rearrange to a conjugated form.

It might be expected that the olefinic and naphthenic polymers would be incompatible with the polyester type of polymer formed from polylactylic acids and fatty oils. However, I have discovered that these hydrocarbon polymers may be incorporated with the polyester resin by adding them in the latter stages of the heating process, and then raising the temperature to about 270° C. to 300° C. The mixture is then heated until an advanced stage of resinification short of becoming insoluble and infusible is reached.

It is obvious that polymeric hydrocarbons cannot combine with a polyester type of polymer by means of interesterification, and it is apparent that modification is effected chiefly by a conjoint polymerization, except for some degree of copolymerization which is likely to occur, especially in the case of the olefinic hydrocarbons, due to their considerable degree of unsaturation, and because of some decomposition of the naphthenic hydrocarbons at the high temperatures (above 275° C.) used.

The removal of water and other volatile products produced during the heating process may be facilitated by the use of a low degree of vacuum in the reaction vessel. The introduction of an inert gas such as carbon dioxide or nitrogen also reduces the time required to process the resin by aiding in the removal of volatile matter. This procedure aids also in the production of a light-colored resin, especially when about 5 percent of maleic anhydride, fumaric acid or a mixture of both are used in the formulation. These agents also serve to accelerate the resinification process doubtless by virtue of the presence of their double bonds. Then, too, by this means about 10 percent of the low-cost, dark colored, olefinic hydrocarbons (petropols) may be incorporated in the resin, and the color of the final product will be darkened to only a moderate degree. The average coating is a golden yellow color when baked on light surfaces. These petroleum derivative polymers sell for only a few cents per pound, and their inclusion in the resin results in some reduction in the cost of the coating.

The ingredients, catalysts, and polymerization conditions for the production of a resin having certain desired properties can be determined readily by experiment. For instance, my resins may be prepared without the use of a catalyst. However, the addition of a condensation or polymerization catalyst appears to confer certain advantages such as a more rapid polymerization and an increase in the hardness and insolubility of the product. Suitable catalysts for this purpose are: Salts and oxides of cobalt, aluminum, aluminum oxide, vanadium, pentoxide, ferric oxide, bauxite, magnesium methoxide, ferrous lactate. Near the end of the polymerization process when the reaction mixture has started to show a rapid increase in viscosity, if the reaction is interrupted by quick cooling, the resin will not have reached the infusible and insoluble stage and is particularly suitable for the preparation of liquid coatings, mixing with fillers, pigments and the like for the preparation of molded articles. The exact point at which the reaction should be interrupted depends upon the ultimate use of the product, and will vary with the temperature, the proportions of reactants and the catalyst used. It can be determined by making preliminary tests for any given set of conditions, and can thereafter be ascertained by means of careful timing and observation of the changes in viscosity.

The yield of resinous products generally obtained ranges from about 65 to 85 percent, depending upon several factors such as the time and temperature required to effect resinification, which varies with different formulations. The use of modified drying oils, for example, conjugated and hydroxylated linseed oils, tends to increase the yield obtained because of their increased reactivity.

As with other condensation polymerization products, the resins of this invention will in general consist of a series of molecules of closely similar structure. The average molecular weight of the polymers is subject to control within certain limits, and the further the reaction has progressed, the higher will be the average molecular weight.

Determinations of the molecular weight of the viscous rubbery polymers (acid number 40 to 50) obtained in the straight condensation of polylactylic acid with fatty oils made by means of the boiling point and melting point methods indicated that the average molecular weight was about 1200 to 1400. Of course, this figure will vary somewhat, depending on the particular procedure used in preparing the resin. The molecular weight of the final baked coatings cannot be accurately determined because of their insoluble and infusible nature. However, from their eucolloidal properties, it may be inferred to be at least of the order of 10,000.

Coatings may be prepared by dissolving the resin in ketones, toluol, xylol and synthetic petroleum products with solvency characteristics comparable to these.

The baked coatings of this invention are resistant to the action of salt water, gasoline, lubricating oil, and to many of the common solvents. They are also resistant to acids in moderate concentration. However, due to the ester-like nature of this resin, it may be susceptible to attack by alkalies, and the modifications described herein are directed mainly to improve the coatings in this respect.

The flexibility, hardness, and resistance of these coatings to various agents may be varied somewhat by the use of different proportions and mixtures of the fatty oils. The proportion of fatty oil used in the formulations should be at least 20 percent of the weight of the ingredients in order to insure adequate flexibility in the baked coatings. The properties of the coating are also influenced by the choice and amount of modifying agents, driers, etc. used. For instance, the use of a zinc drier in conjunction with other metallic driers increases the resistance to alkali, but may decrease the resistance to steam. Then, too, a thin coating will bake more rapidly, be harder and more resistant to the action of steam than a thick coating.

For many purposes, the durability and appearance of the resinous product is enhanced by the addition of pigments. The usual types of pigment may be incorporated, although chemically inert, heat stable ones are preferred, such as titanium dioxide, carbon black, iron oxides, and earth colors.

My invention also comprises water emulsion coatings, which may be prepared by dispersing the liquid resin in water. As an aid in forming the emulsion, fatty acids and an amine such as ethylene diamine may be added. The emulsion may be stabilized by the addition of bentonite or a vegetable protein, and metallic driers may also be added during the formulation.

It is to be understood further that gaskets, tubes, extruded products, and other flexible articles are within the scope of this invention. These may be prepared by the incorporation of driers, fillers, and curing agents in the resin and heating moderately, preferably at temperatures below about 125° C.

My invention includes also the use of the polymeric product in the impregnating, gluing, and molding of various articles, such as laminated paper, wood and metal products. The use of elevated temperatures and high pressures in the formation of these compositions is familiar to those skilled in the art.

Having thus described my invention, I claim:

1. A process for preparing a resinous material which comprises heating at polymerizing temperatures a mixture of between 35 and 70% polylactylic acids, between 20 and 50% fatty drying oils, and about 5% of a member selected from the group consisting of fumaric acid, maleic anhydride, and mixtures of fumaric acid and maleic anhydride until partial polymerization is effected, then adding between 10 and 15% of an oil-soluble hydrogenated coumarone-indene resin having a melting point of from 145° to 155° C., said percentages being based on the total weight of the ingredients, and continuing the heating under conditions permitting the removal of volatile products of reaction until a viscous, elastic, resinous product is formed.

2. A process for preparing a resinous material which comprises heating at polymerizing temperatures in the presence of a polymerization catalyst a mixture of between 35 and 70% polylactylic acids, between 20 and 50% fatty drying oils, and about 5% of a member selected from the group consisting of fumaric acid, maleic anhydride, and mixtures of fumaric acid and maleic anhydride until partial polymerization is effected, then adding between 10 and 15% of an oil-soluble hydrogenated coumarone-indene resin having a melting point of from 145° to 155° C., said percentages being based on the total weight of the ingredients, and continuing the heating under conditions permitting the removal of volatile products of reaction until a viscous, elastic, resinous product is formed.

3. A process for preparing a resinous material which comprises heating at polymerizing temperatures in the absence of any appreciable amount of oxygen a mixture of between 35 and 70% polylactylic acids, between 20 and 50% fatty drying oils, and about 5% of a member selected from the group consisting of fumaric acid, maleic anhydride, and mixtures of fumaric acid and maleic anhydride until partial polymerization is effected, then adding between 10 and 15% of an oil-soluble hydrogenated coumarone-indene resin having a melting point of from 145° to 155° C., said percentages being based on the total weight of the ingredients, and continuing the heating under conditions permitting the removal of volatile products of reaction until a viscous, elastic, resinous product is formed.

4. A process for preparing a resinous material which comprises heating at polymerizing temperatures a mixture of between 35 and 70% polylactylic acids and between 20 and 50% fatty drying oils until partial polymerization is effected, then adding between 10 and 15% of an oil-soluble hydrogenated coumarone-indene resin having a melting point of from 145° to 155° C., said percentages being based on the total weight of the ingredients, and continuing the heating under conditions permitting the removal of volatile products of reaction until a viscous, elastic, resinous product is formed.

5. A process for preparing a resinous material which comprises heating at polymerizing temperatures a mixture of between 35 and 70% polylactylic acids, between 20 and 50% fatty drying oils, between 10 and 15% of an oil-soluble hydrogenated coumarone-indene resin having a melting point of from 145° to 155° C., said percentages being based on the total weight of the ingredients, said heating being effected under conditions permitting the removal of volatile products of reaction until a viscous, elastic, resinous product is formed.

6. A resinous material produced by the process of claim 5.

7. An aqueous emulsion of the resinous material produced by the process of claim 5.

PAUL D. WATSON.

REFERENCES CITED

The following references are of record in the file of this patent:

UNITED STATES PATENTS

| Number | Name | Date |
|---|---|---|
| 2,363,103 | Watson | Nov. 21, 1944 |